United States Patent [19]

Auerbach

[11] Patent Number: 4,928,807
[45] Date of Patent: May 29, 1990

[54] METHOD AND APPARATUS FOR TURNING FLAT ARTICLES

[75] Inventor: David R. Auerbach, West Redding, Conn.

[73] Assignee: Pitney Bowes Inc., Stamford, Conn.

[21] Appl. No.: 279,000

[22] Filed: Dec. 2, 1988

[51] Int. Cl.⁵ .............................................. B65G 47/24
[52] U.S. Cl. .................................... 198/379; 198/414; 271/185
[58] Field of Search ................... 198/379, 414, 463.3, 198/836, 861.5, 631, 592; 271/2, 184, 185, 266; 414/754, 757, 758

[56] References Cited

U.S. PATENT DOCUMENTS

| | | | |
|---|---|---|---|
| 3,936,993 | 2/1976 | Dorer | 198/463.3 X |
| 4,214,744 | 7/1980 | Evans | 198/836 X |
| 4,457,419 | 7/1984 | Ogami et al. | 198/414 X |
| 4,756,521 | 7/1988 | Martin | 271/185 X |

FOREIGN PATENT DOCUMENTS

| | | | |
|---|---|---|---|
| 268144 | 1/1969 | Austria | 198/592 |
| 2205153 | 8/1973 | Fed. Rep. of Germany | 198/414 |

Primary Examiner—Robert J. Spar
Assistant Examiner—Cheryl L. Gastineau
Attorney, Agent, or Firm—Charles R. Malandra, Jr.; Melvin J. Scolnick; David E. Pitchenik

[57] ABSTRACT

A method and apparatus for turning flat articles. The apparatus includes a frame; a pair of substantially horizontal, pivotable belt assemblies for receiving a serial stream of the articles traveling along a path, each of the belt assemblies having an upper and a lower reach and an entrance and an exit end; a rotatable and vertically reciprocable disk member suitably mounted to the frame and situated between the belt assemblies; a biased, pivot ball suitably mounted to the frame and located above the reciprocable disk member; and an idler roller situated above the upper reaches of the belt assemblies at the exit ends thereof and engageable with the exit ends of the belt assemblies for transporting the flat articles downstream from the disk member and ball.

14 Claims, 11 Drawing Sheets

METHOD AND APPARATUS FOR TURNING FLAT ARTICLES

BACKGROUND OF THE INVENTION

The instant invention relates generally to methods and apparatus for turning flat articles and is particularly related to methods and apparatus for turning envelopes.

Turning devices for flat articles that are conveyed horizontally are required in mail processing machines. Examples of flat articles include envelopes, letters, postcards, endless forms issued by a computer controlled printing device that are cut into sheets from an endless web, and the like. In an inserter and mail processing machine, sheets are fed, one by one or collected together, to a folding station and subsequently, with or without additional enclosures, are conveyed to an inserting station where the sheets are inserted into an envelope.

After insertion of the sheets into the envelope, the stuffed envelope is forwarded to a postage station where postage is imprinted thereon by a postage meter. In certain inserters, it is necessary to turn the stuffed envelopes through a 90 degree angle if the postage meter is oriented in the same direction as the discharge from the inserting station. Many types of turners are known in the prior art to effect a 90 degree turn. Many, however, turn the envelope on an edge which risks damage to the envelope and is more time consuming because a greater radius of turn is required than for a turn on the center of gravity of the envelope. In general, the prior art devices slow down the throughput of the mailing system. The instant invention therefore provides a method and apparatus for turning flat articles such as envelopes on their centers of gravity through 90 degrees and removes them from the turning mechanism more quickly and efficiently than prior art devices.

SUMMARY OF THE INVENTION

Accordingly, the instant invention provides a method and apparatus for turning flat articles. The apparatus comprises: a frame; a pair of substantially horizontal, pivotable belt assemblies for receiving a serial stream of said articles traveling along a path, each of said belt assemblies having an upper and a lower reach and an entrance and an exit end; a rotatable and vertically reciprocable disk member suitably mounted to said frame and situated between said belt assemblies; a biased, pivot ball suitably mounted to said frame and located above said reciprocable disk member; and an idler roller situated above the upper reaches of said belt assemblies at the exit ends thereof and engageable with the exit ends of said belt assemblies for transporting said flat articles downstream from said disk member and ball.

BRIEF DESCRIPTION OF THE DRAWINGS

FIG. 6 is a perspective view of the envelope turning apparatus seen in FIG. 1 and showing three sequential positions of an envelope as it is engaged and turned by the turning apparatus;

FIG. 18 is a horizontal, sectional view of the Geneva gears seen in FIG. 17.

DETAILED DESCRIPTION OF THE PREFERRED EMBODIMENT

In describing the preferred embodiment of the instant invention, reference is made to the drawings wherein there is seen a table-top inserter generally designated 20 which feeds and inserts documents (not seen) into an envelope 22. The stuffed envelope 22 is then fed onto a pivotable feed deck 24 of an envelope turning apparatus generally designated 26, which includes a pair of pivotable belt assemblies 28 and 30.

Figure 1:
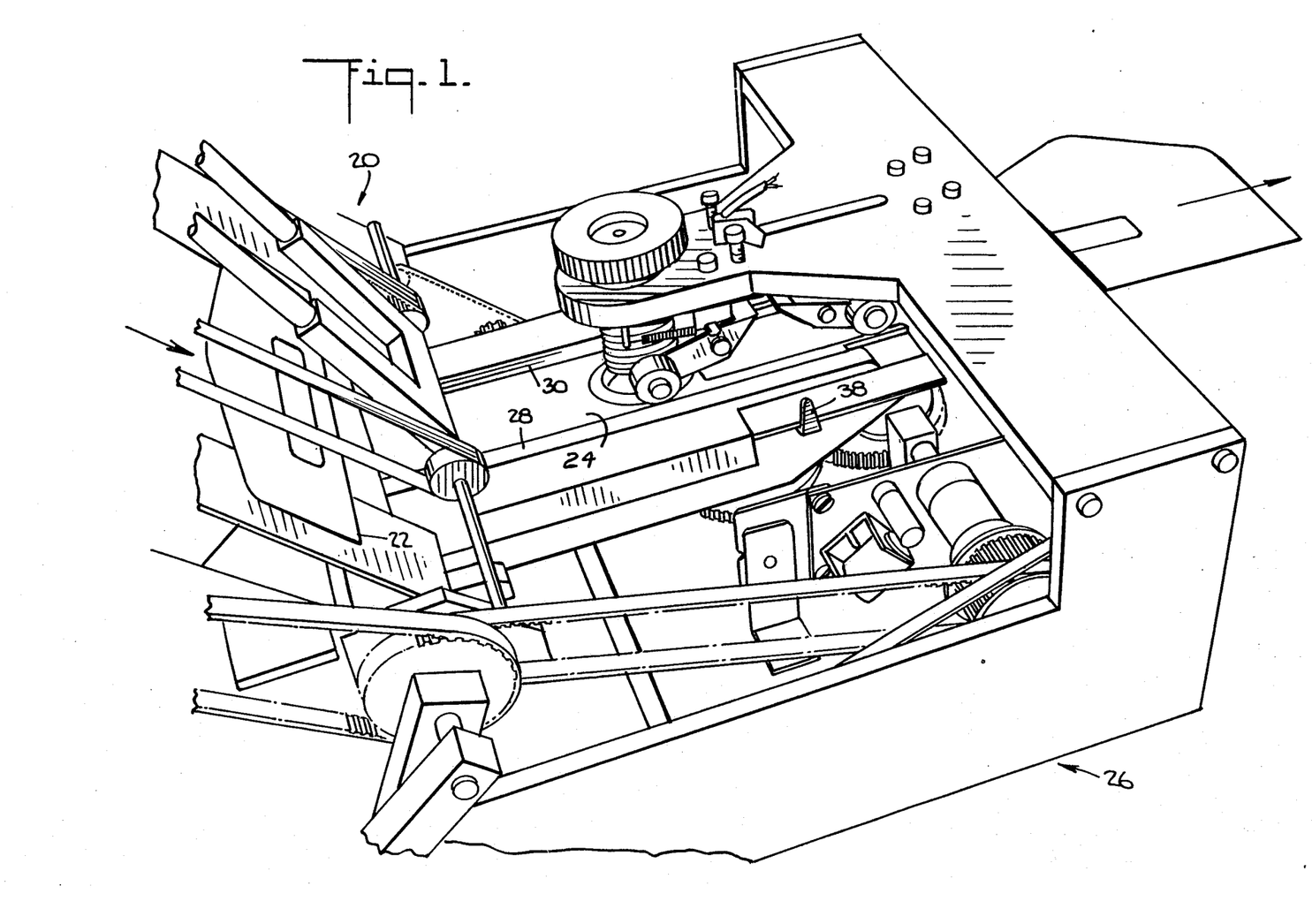
FIG. 1 is a perspective view of envelope turning apparatus in accordance with the instant invention.
Figure 2:
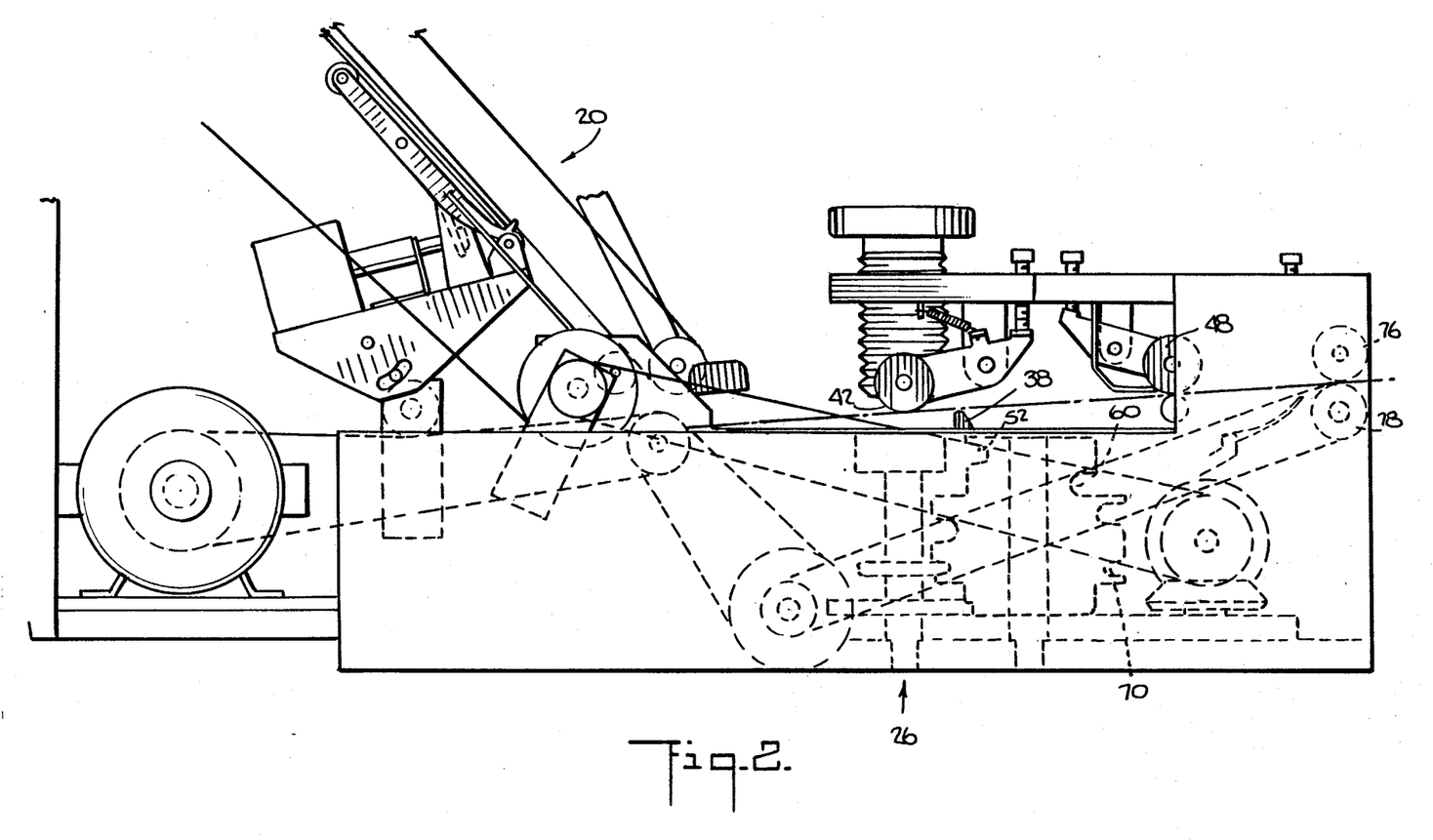
FIG. 2 is a side elevational view of the apparatus seen in FIG. 1.
Figure 3:
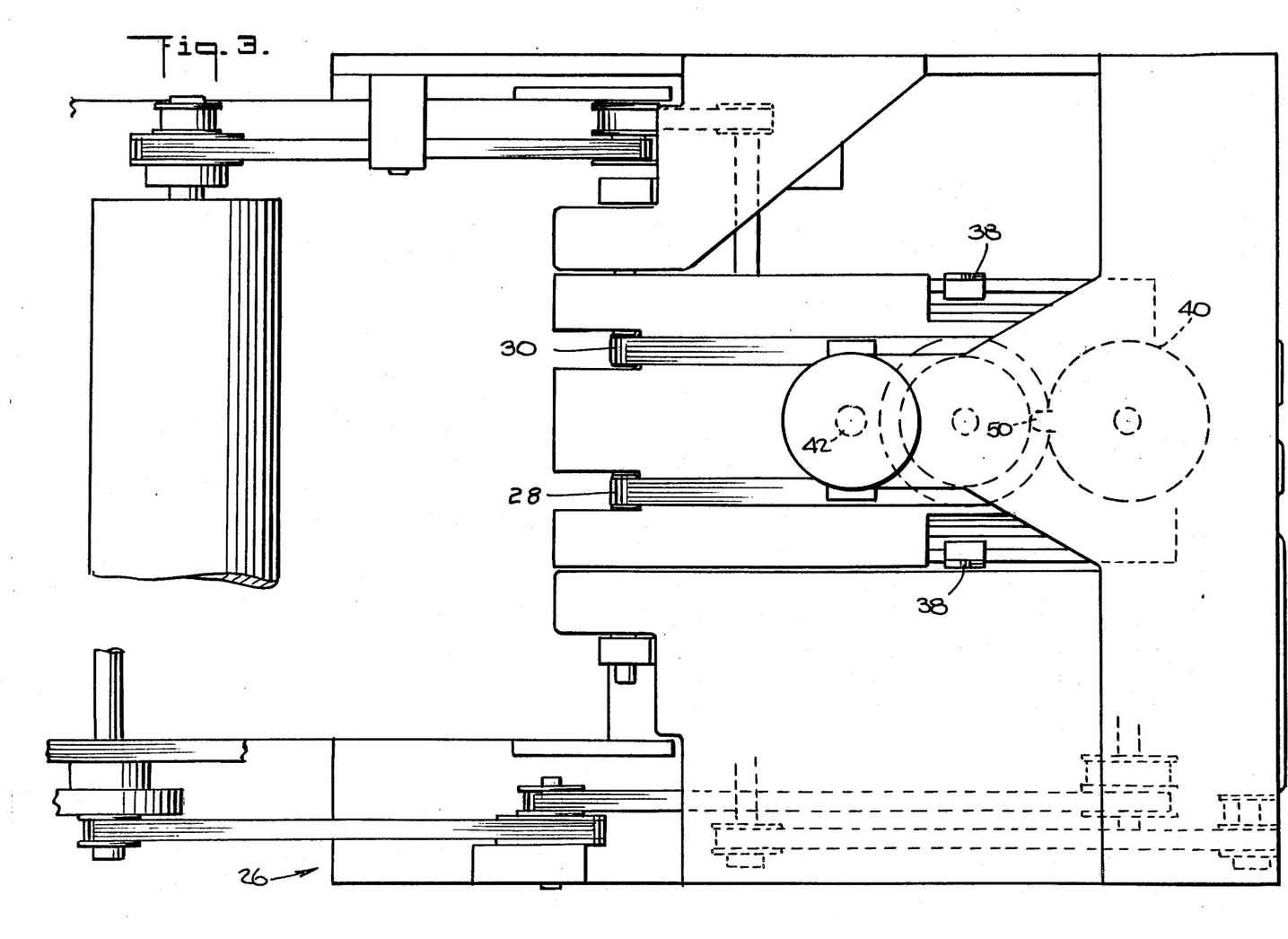
FIG. 3 is a top plan view of the apparatus seen in FIG. 1.
Figure 4:
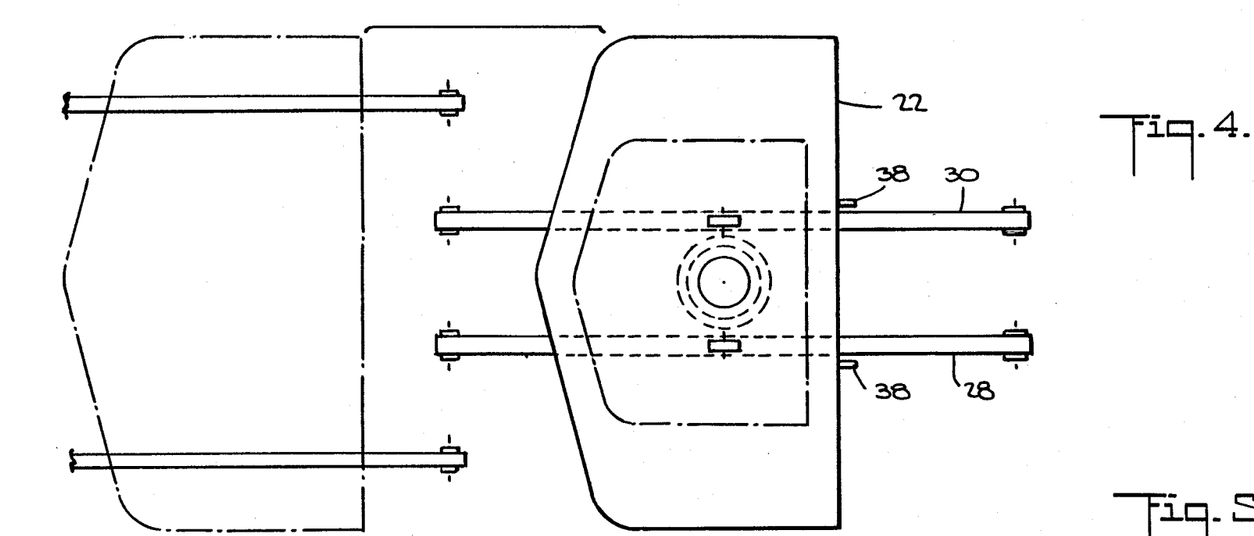
FIG. 4 is an enlarged, top plan view showing an envelope in a position about to be turned 90 degrees.
Figure 5:
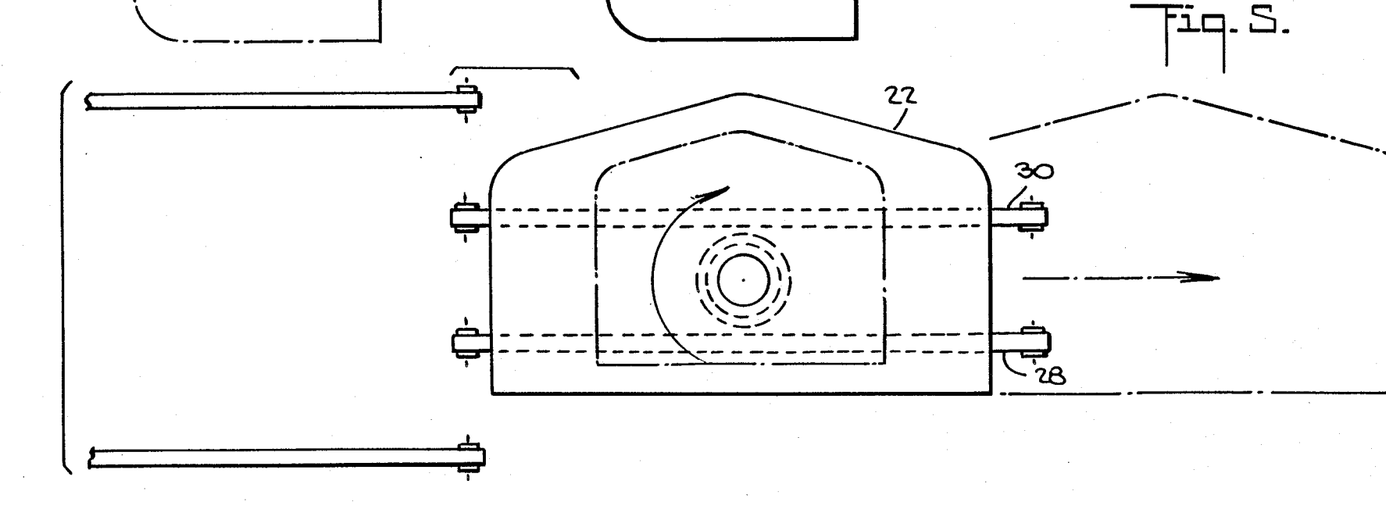
FIG. 5 is the same as FIG. 4 but shows the envelope after it has been rotated 90 degrees.
Figure 7:
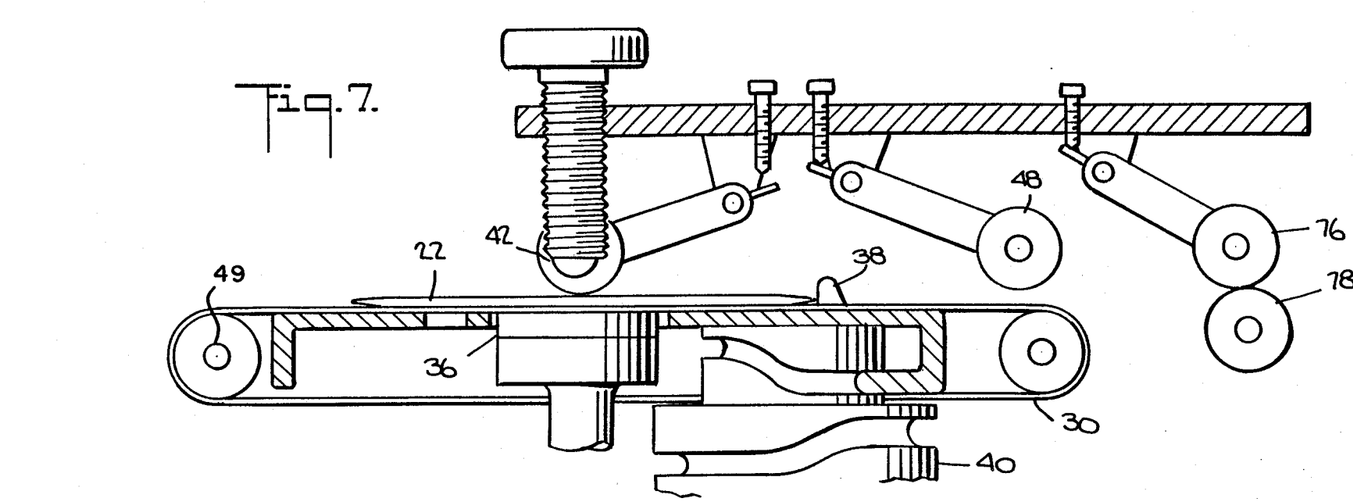
FIG. 7 is a central, vertical, sectional view of the apparatus seen in FIG. 6, showing the envelope immediately prior to being turned.
Figures 8, 9:
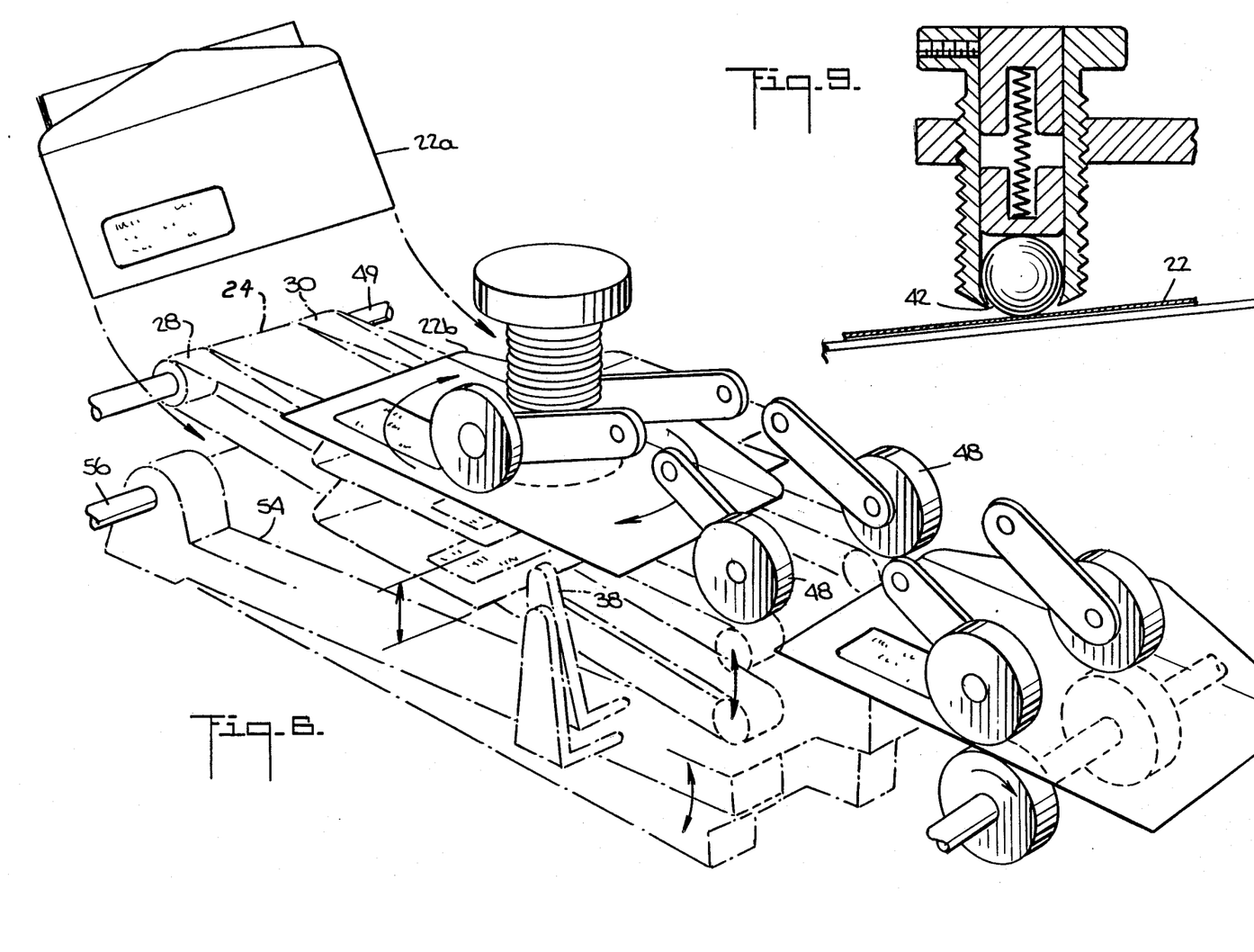
FIG. 8 is similar to FIG. 7 but the apparatus and envelope have assumed new positions subsequent to the envelope having been turned.
FIG. 9 is a central, vertical, sectional view of the biased, pivot ball and envelope in the position seen in FIG. 8.
Figure 8:
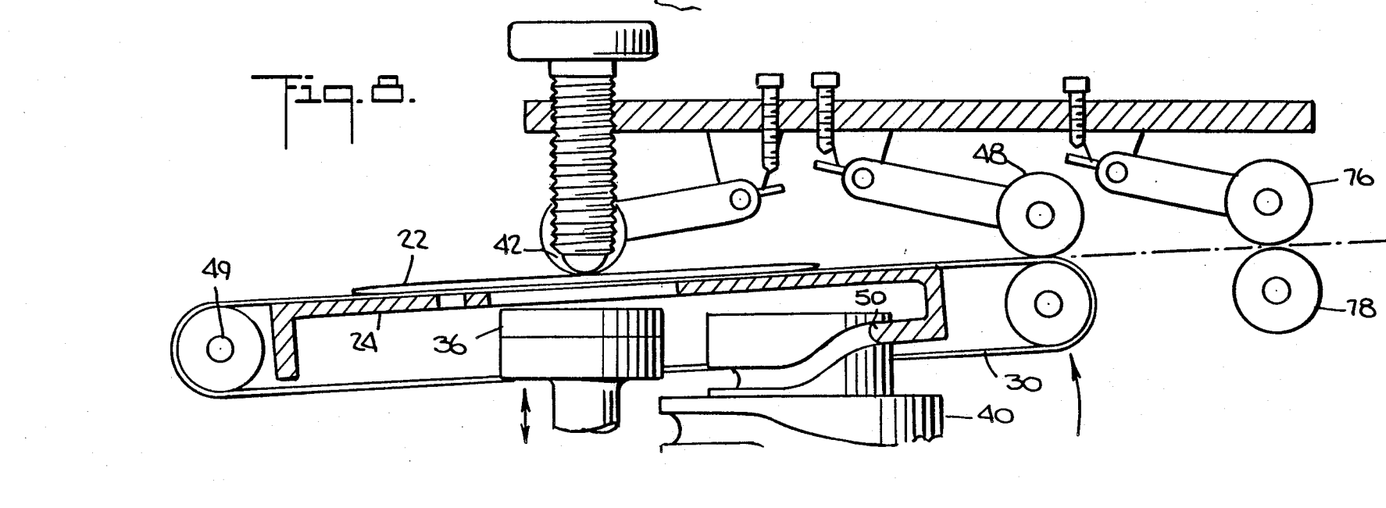
Figure 10:
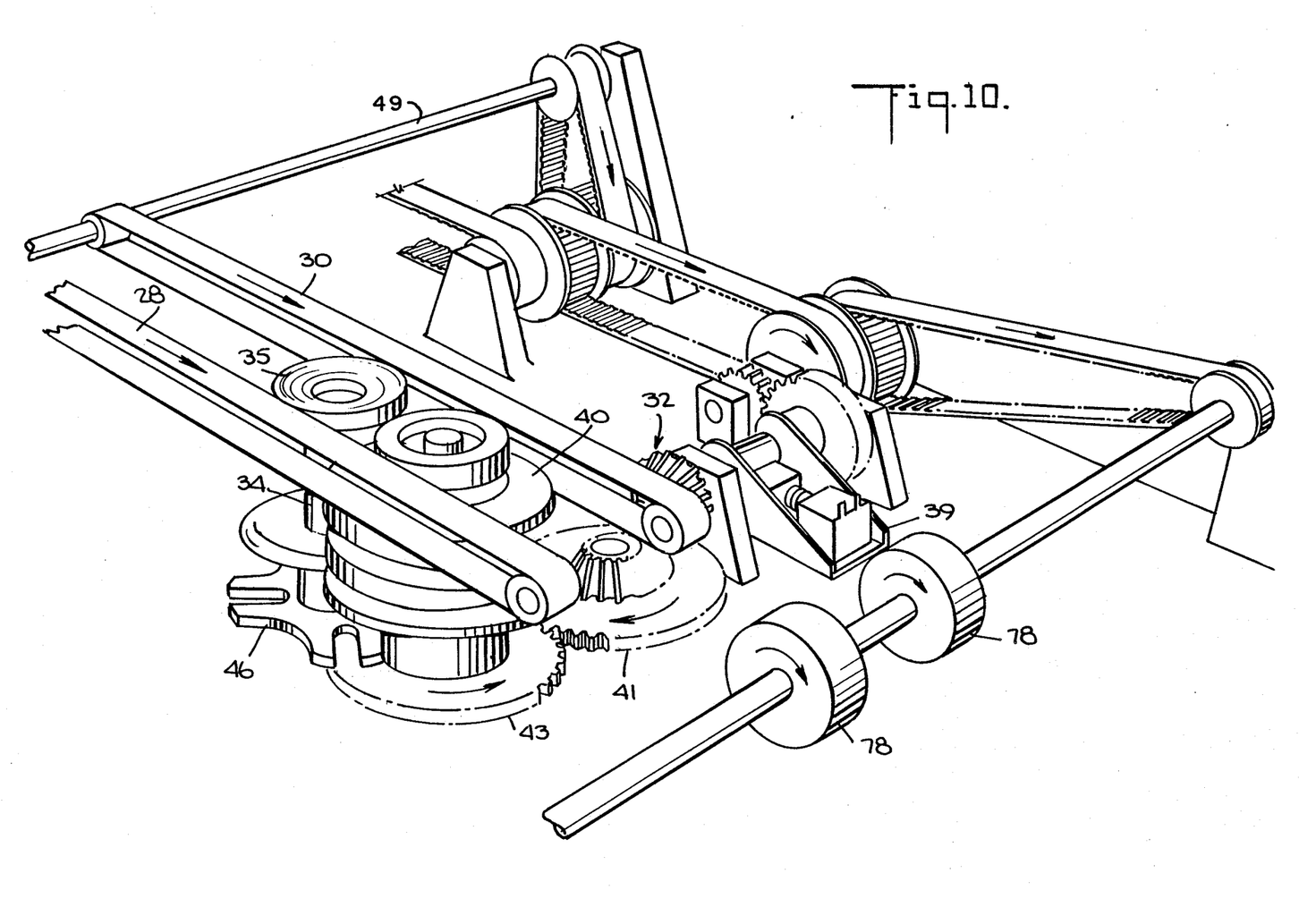
FIG. 10 is a perspective view of the gear mechanisms situated beneath the plane of transport of the envelope for driving the turning apparatus seen in FIG. 1.
Figure 11:
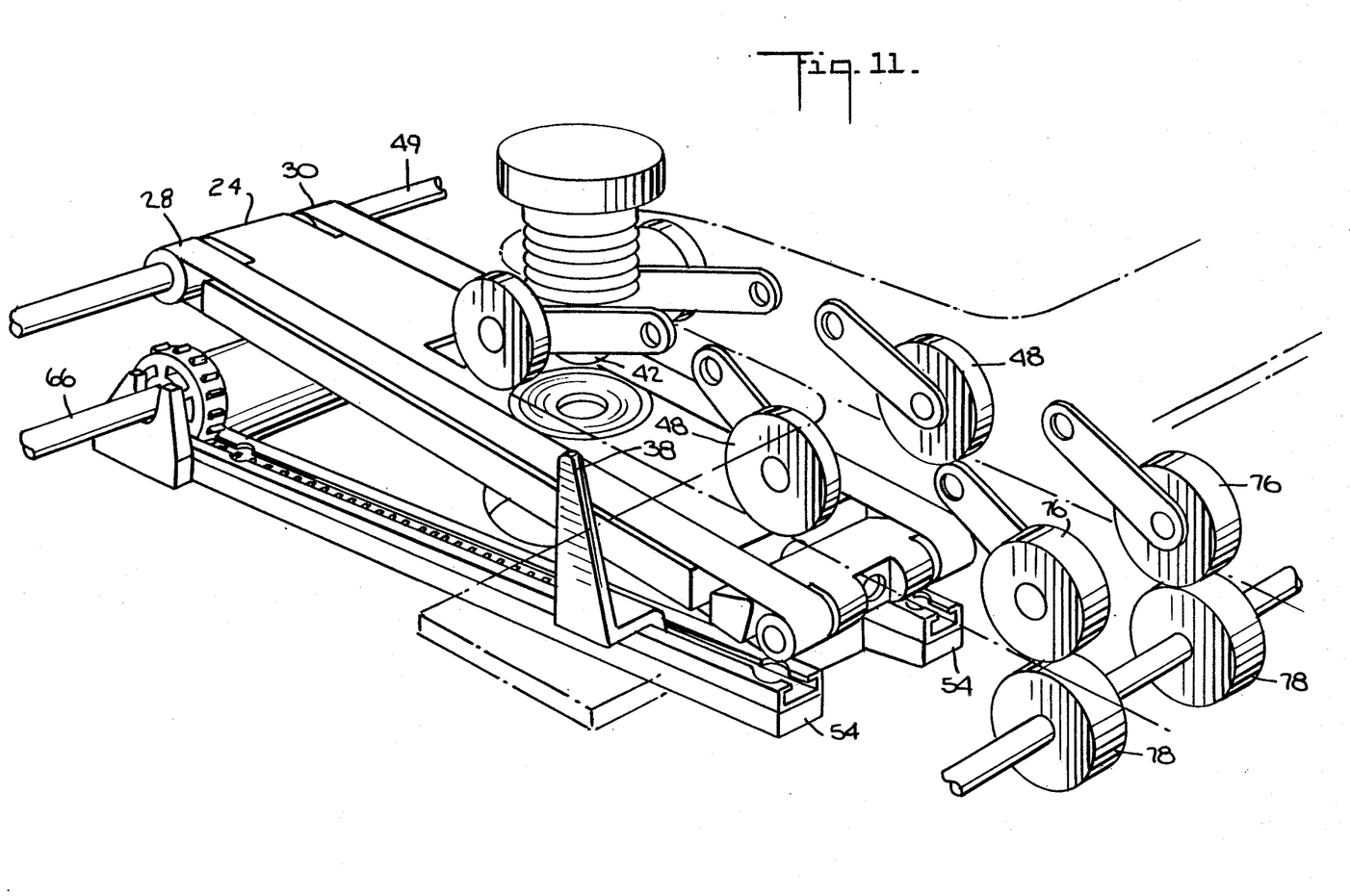
FIG. 11 is a perspective view showing the pivotable belt assemblies for transporting the envelopes.
Figure 12:
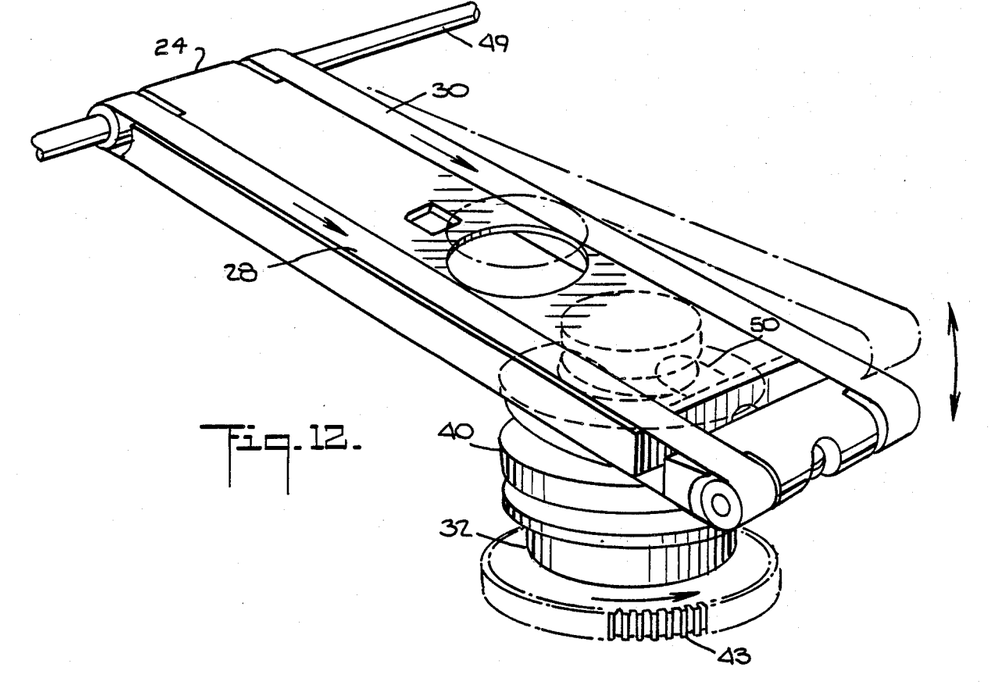
FIG. 12 is a perspective view of the belt assemblies and four function cam used to drive the turning apparatus seen in FIG. 1.
Figure 13:
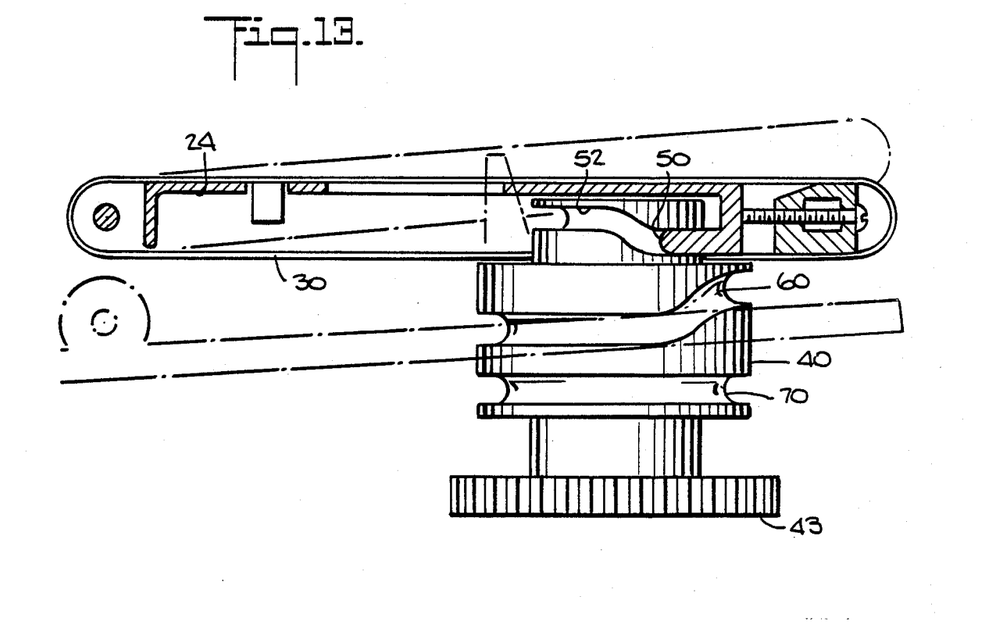
FIG. 13 is a central, vertical sectional view of the apparatus seen in FIG. 12.
Figures 14, 15:
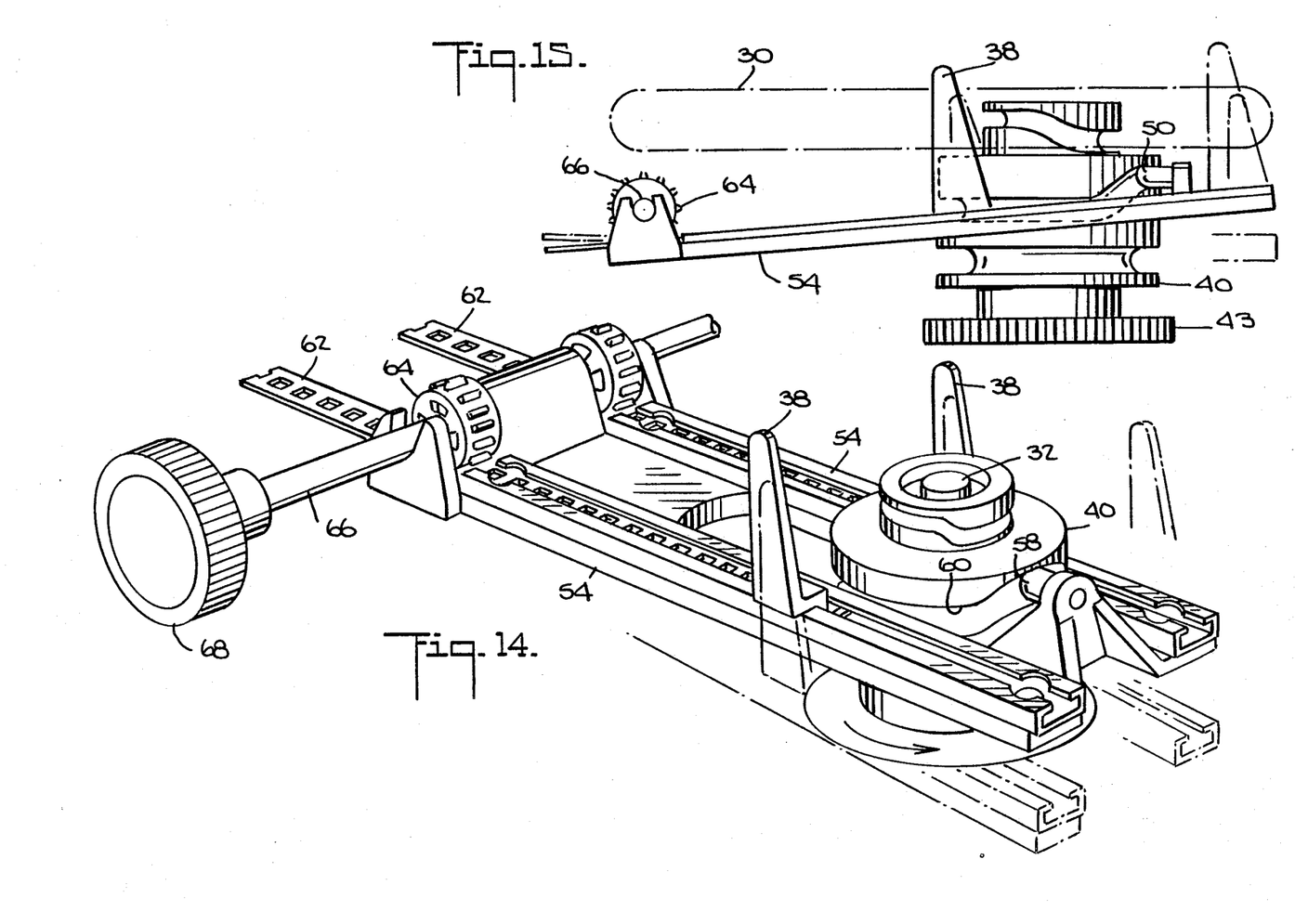
FIG. 14 is a perspective view of the four function cam and associated drive mechanisms seen in FIG. 10.
FIG. 15 is a side elevational view of the apparatus seen in FIG. 14.
Figure 15:
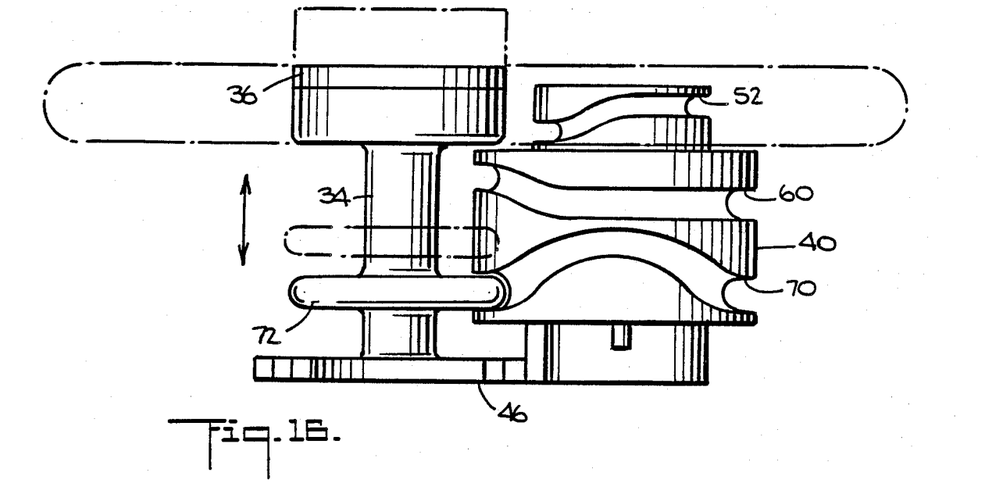
Figures 16, 17:
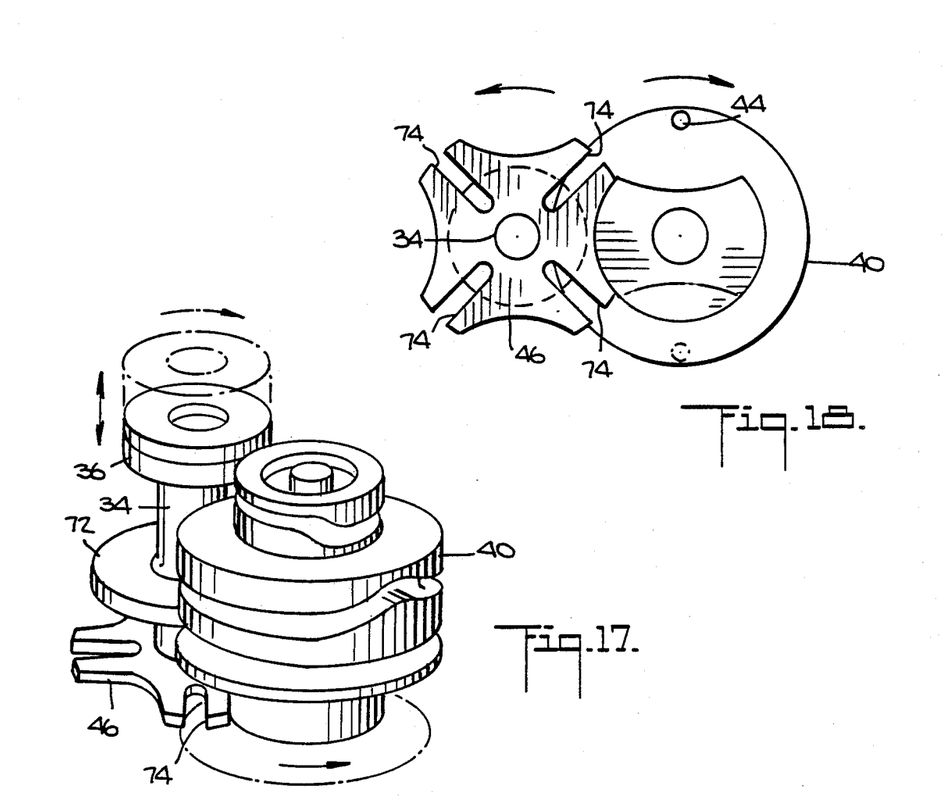
FIG. 16 is an enlarged, side elevational view of the four function cam and its associated driving mechanisms, showing the Geneva gears.
FIG. 17 is a perspective view of the apparatus seen in FIG. 16.

As best seen in FIG. 6, the envelopes 22 are initially fed from the inserter 20 in the alignment manifested by envelope 22a, i.e. the length of the envelope 22 is perpendicular to the direction of travel. The envelope turner 26 then effects a 90 degree rotation as manifested by the envelope 22b. The envelopes 22 being fed from the inserter 20 to the turning deck 24 are stopped by a pair of adjustable, registration stops 38. While the envelope 22 is being so fed, the deck 24 and the pivotable belt assemblies 28 and 30 are in a horizontal alignment, i.e. the lower position seen in FIG. 2. When the envelope 22 is sensed to be in the position seen in FIG. 4, a one cycle clutch 39 (see FIG. 10) is engaged to begin to turn a shaft assembly 32 which drives a four-function cam 40 through a series of gears 41 and 43. The first 45 degrees of rotation of the shaft assembly 32 lifts the turner shaft 34, which has an elastomeric disk 36 secured to the top which pins the envelope 22 between the disk 36 and a spring loaded pivot ball 42. During the upward motion of the turner shaft 34, a cam follower 58 that is engaged by the cam 40 lowers the registration stops 38 so that the stops 38 cannot interfere with the rotation of the envelope 22. Subsequent to this first 45 degree rotation, a pin 44 on the cam 40 engages a Geneva gear 46 located at the bottom of the turner shaft 34 to thereby turn the envelope 22 90 degrees. Another rotation of 45 degrees of the shaft assembly 32 and cam 40 effects a lowering of the disk 36, a raising of the registration stops 38 and a raising of the deck 24 and the belt assemblies 28 and 30 which causes the envelope 22 to be engaged by a pair of idler rollers 48 (see FIG. 8). The next 135 degrees of rotation of the shaft 32 and cam 40 serves to hold the deck 24 and belt assemblies 28 and 30 up in the angular position seen in FIG. 8 in order to drive the envelope 22 away from the disk 36 and into a pair of exit rollers 76 and 78 (see FIGS. 7 and 8). The final 45 degrees of rotation of the shaft 32 and cam 40 lowers the deck 24 and the belt assemblies 28 and 30 to the horizontal position seen in FIG. 7, thereby exposing the registration stops 38 for the next sequence of envelope turning.

The deck 24 and the belt assemblies 28 and 30 pivot about a shaft 49. The deck 24 includes a cam follower 50 which tracks a race 52 on the four-function cam 40. Thus, the cam follower 50 controls the raising and lowering of the deck 24 and belt assemblies 28 and 30.

The adjustable registration stops 38 are slidably mounted on a stop bracket 54 which is pivotably mounted on a shaft 66. The stop bracket 54 is joined at one end by the cam follower 58 which tracks a race 60 on the four-function cam 40. More specifically, the stops 38 are situated at the end of a pair of translatable racks 62, which are translated by a pair of pinion gears 64 mounted on the shaft 66. A knob 68 is situated at one end of the shaft 66 for turning the shaft 66 and pinion gears 64 which in turn translate the racks 62 to thereby adjust the position of the stops 38.

The four-function cam 40 further includes a race 70 which is engaged by a cam follower 72 extending from the turner shaft 34. The race 70 thus controls the raising and lowering of the turner shaft 34 which effects the raising and lowering of the elastomeric disk 36 which engages the envelopes 22.

Finally, the fourth function of the four-function cam 40 is effected by the pin 44 which engages the slots 74 of the Geneva gear 46, which controls the rotation of the turner shaft 34. The home position of the pin 44 is indicated in phantom in FIG. 18. As is well known, the pin 44 enters a slot 74 and thereby engages the shaft 34 to rotate it 90 degrees in the case of four slots until it withdraws from the first slot 74 and on the next cycle of the shaft 32, the pin 44 engages a second slot 74 to again rotate the shaft 32 90 degrees, and so on. In such a manner, the disk 36 is rotated 90 degrees in order to turn the envelope 22 90 degrees.

Once the envelopes 22 have been turned by the disk 36, they are removed from the disk 36 by the cooperation of the belts 28 and 30 with the idler rollers 48 which in turn feed the envelopes to the exit rollers 76 and 78 for further processing as desired.

It can be seen that the turning apparatus 26 described hereinabove is capable of turning the envelopes 22 on their axis or center of gravity. The adjustable stops 38 allow an adjustment to be made so that the envelope, regardless of its size, can be stopped in a position in which its axis or center of gravity is situated directly below the pivot ball 42 and above the disk 36, which combine to turn the envelope 22.

It can also be seen that because of the pivoting of the deck 24 and the belt assemblies 28 and 30, that there is no need to stop the movement of any of the moving parts of the turning apparatus 26, such as the belt assemblies 28 and 30. The arrangement of the turner 26 thus eliminates the need for clutches and provides apparatus which will run for long periods of time without breakdown.

It should be understood by those skilled in the art that various modifications may be made in the present invention without departing from the spirit and scope thereof, as described in the specification and defined in the appended claims.

What is claimed is:

1. Apparatus for turning flat articles, comprising:
   a frame;
   a pair of substantially horizontal, pivotable belt assemblies for receiving a serial stream of said articles traveling along a path, each of said belt assemblies having an upper and a lower reach and an entrance and an exit end;
   a rotatable and vertically reciprocable disk member suitably mounted to said frame and situated between said belt assemblies for lifting each of said articles off said belt assemblies;
   a biased, pivot ball suitably mounted to said frame and located above said reciprocable disk member for pinning each of said articles when each of said articles is lifted by said disk member; and
   an idler roller situated above the upper reaches of said belt assemblies at the exit end of said belt assemblies for transporting said flat articles downstream from said disk member and ball.

2. The apparatus of claim 1, additionally comprising a multi-function cam for controlling the pivoting of said belt assemblies and the vertical reciprocation of said disk member.

3. The apparatus of claim 2, additionally comprising a pair of adjustable, registration stops adjustably mounted on said frame for stopping the articles received on said belt assemblies.

4. The apparatus of claim 3, wherein said registration stops are vertically movable above and below said path of said articles.

5. The apparatus of claim 4, wherein said multi-function cam also controls the vertical movement of said registration stops.

6. The apparatus of claim 5, wherein said multi-function cam also controls the rotation of said disk member.

7. The apparatus of claim 6, additionally comprising a shaft rotatably mounted to said frame for supporting said disk member, said shaft including a Geneva gear which engages said multi-function cam.

8. The apparatus of claim 7, wherein said Geneva gear includes four slots to effect a 90 degree rotation of said articles.

9. The apparatus of claim 8, wherein said article comprises an envelope.

10. The apparatus of claim 9, wherein said registration stops are adjusted in order to effect a turning of said envelopes on the axis of said envelopes.

11. A method of turning flat articles, comprising:
    feeding a stream of articles seriatim onto a pivotable, horizontal deck and belt assemblies;
    stopping each of said articles on said horizontal deck and belt assemblies;
    lifting each of said articles off said horizontal deck and belt assemblies;
    turning each of said articles;
    lowering each of said articles onto said horizontal deck and belt assemblies;

raising a downstream end of said deck and belt assemblies by pivoting the deck and belt assemblies about an upstream end;

removing each of said articles from said raised deck and belt assemblies; and lowering the downstream end of said deck and belt assemblies preparatory for another cycle of turning said articles by pivoting the deck and belt assemblies about the upstream end.

12. The method of claim 11, wherein each of said articles is turned 90 degrees.

13. The method of claim 12, wherein stopping, turning raising and lowering steps are all controlled by a single, multi-function cam.

14. The method of claim 13, wherein said turning is effected by a rotatable and vertically reciprocable disk member.

* * * * *